(12) United States Patent
Stoeckl et al.

(10) Patent No.: US 7,731,461 B2
(45) Date of Patent: Jun. 8, 2010

(54) LOAD-BEARING RAIL

(75) Inventors: Siegfried Stoeckl, Pfeffenhausen (DE); Werner P. Schlecht, Vaihingen (DE); Thomas Seeg, Ostfildern (DE); Henning Sparrer, Notzingen (DE)

(73) Assignees: Bayerische Motoren Werke Aktiengesellschaft, Munich (DE); BOS GmbH & Co. KG, Ostfildern (DE)

( * ) Notice: Subject to any disclaimer, the term of this patent is extended or adjusted under 35 U.S.C. 154(b) by 752 days.

(21) Appl. No.: 11/482,917

(22) Filed: Jul. 10, 2006

(65) Prior Publication Data

US 2007/0041804 A1 Feb. 22, 2007

Related U.S. Application Data

(63) Continuation of application No. PCT/EP2004/014413, filed on Dec. 17, 2004.

(30) Foreign Application Priority Data

Jan. 8, 2004 (DE) ........................ 10 2004 001 367

(51) Int. Cl.
*B60P 7/08* (2006.01)

(52) U.S. Cl. ..................... 410/104; 410/8; 410/106; 410/115

(58) Field of Classification Search ............... 410/8–12, 410/46, 67, 75, 104–106, 109–110, 112–116, 410/130; 296/184.1, 187.08, 193.07, 204, 296/205, 39.2; 280/33.997, 124.109
See application file for complete search history.

(56) References Cited

U.S. PATENT DOCUMENTS

| 3,266,837 | A  | * | 8/1966 | Stricker, Jr. et al. | |
| 6,592,310 | B2 | * | 7/2003 | Hyp et al. ................ | 410/104 |
| 7,097,401 | B2 | * | 8/2006 | Haspel ..................... | 410/101 |
| 2003/0184107 | A1 | | 10/2003 | Hapspel et al. | |
| 2004/0222260 | A1 | | 11/2004 | Haspel | |

FOREIGN PATENT DOCUMENTS

| DE | 4026157 A1 | 5/1992 |
| DE | 199 30 763 A1 | 2/2001 |
| DE | 100 47 542 A1 | 1/2002 |
| DE | 101 00 712 A1 | 7/2002 |
| DE | 10149186 A1 | 4/2003 |
| EP | 1 072 468 A1 | 1/2001 |
| EP | 1 300 283 A2 | 4/2003 |
| FR | 2675442 A1 | 10/1992 |

OTHER PUBLICATIONS

German "Office Action" dated Dec. 2, 2004 with English translation (Six (6) pages).
International Search Report dated Mar. 23, 2005.

* cited by examiner

*Primary Examiner*—Stephen Gordon
(74) *Attorney, Agent, or Firm*—Crowell & Moring LLP

(57) ABSTRACT

A load-bearing rail is provided for the cargo space of a motor vehicle, which is used for accommodating a load-bearing eyelet that can be guided therein in a movable and lockable manner. To provide a load-bearing rail for the cargo space of a motor vehicle, which may assume additional functions in order to both keep the weight low and to reduce the number of parts and thus to lower the cost of production, the load-bearing rail is provided with a bracket, which sticks out laterally and which serves as a support for a floor of the cargo space.

5 Claims, 5 Drawing Sheets

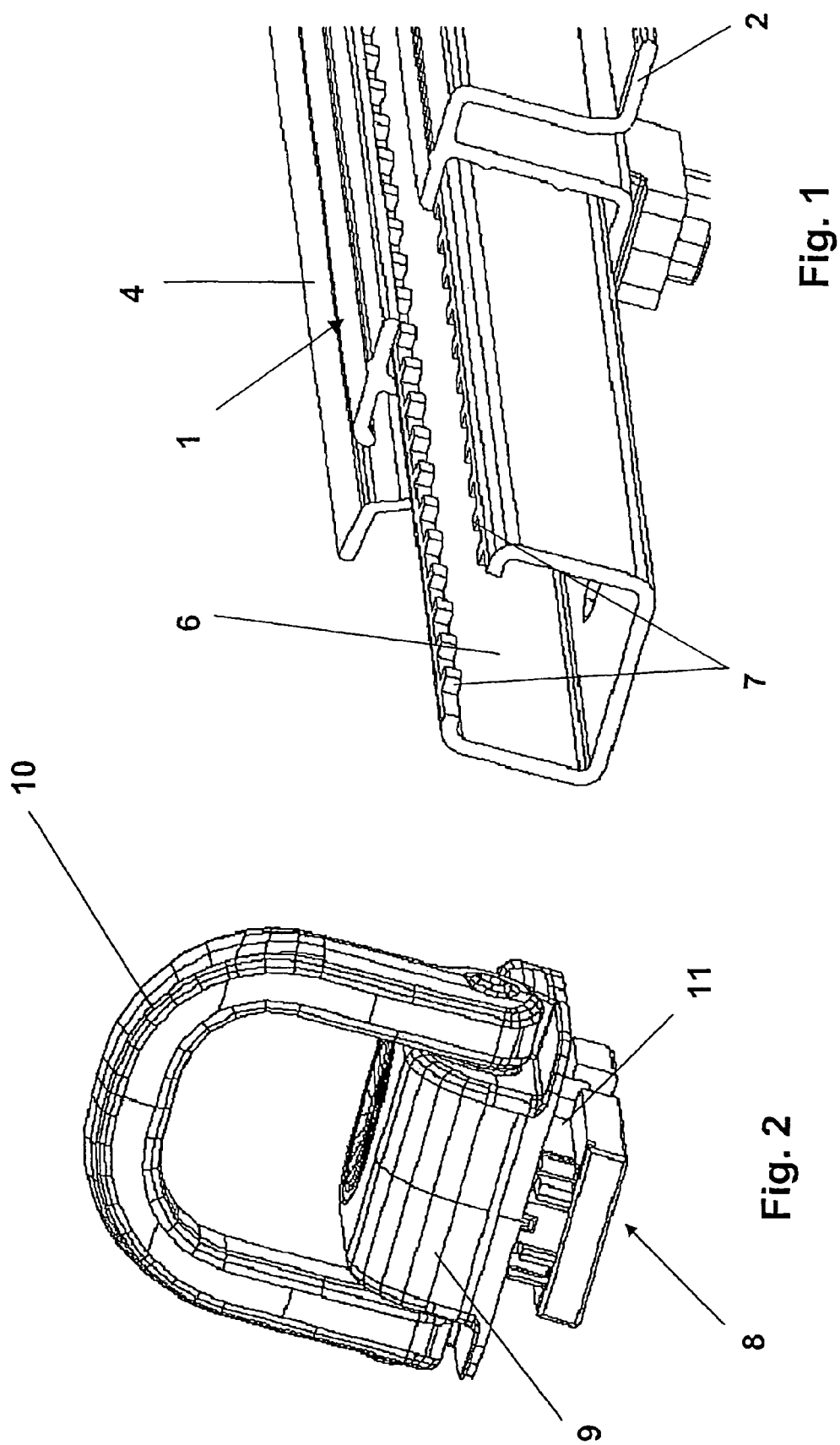

LOAD-BEARING RAIL

CROSS-REFERENCE TO RELATED APPLICATIONS

This application is a continuation of PCT International Application No. PCT/EP2004/014413, filed on Dec. 17, 2004, which claims priority under 35 U.S.C. §119 to German Application No. 10 2004 001 367.5, filed Jan. 8, 2004, the entire disclosures of which are expressly incorporated by reference herein.

BACKGROUND AND SUMMARY OF THE INVENTION

The invention relates to a load-bearing rail for the cargo space of a motor vehicle, which is used for accommodating a load-bearing eyelet that can be guided therein in a movable and lockable manner.

Such load-bearing rails are generally known. They are rigidly connected in the cargo space or rather trunk of a passenger vehicle. The function of these load-bearing rails is to lock in a movable manner load-bearing eyelets, which are also called load-securing eyelets and are often hook-shaped, in the trunk of a passenger vehicle. These load-bearing eyelets are used to secure objects by means of straps, thereby preventing the objects from sliding out of place during the trip. Such load securing is important because it has been demonstrated in the past that when heavy objects located in the trunk slide out of place during a trip, the result is a different driveability of the passenger vehicle—an effect that may be a problem especially in such extreme situations as fast driving in a curve. All this can be avoided by suitably securing the objects with straps at the load-bearing eyelets.

However, there is the drawback that the prior art load-bearing rails, which accommodate the load-bearing eyelets in a movable manner, represent an additional component. In addition to the load-bearing rails, a frame for accommodating the floor of the cargo space is needed. Therefore, the load-bearing rails represent a component that increases not only the overall weight of the passenger car and the number of parts, but also raises the cost of manufacturing the entire passenger car as a consequence of the additional costs of production and assembly for the load-bearing rails.

Therefore, one aspect of the present invention is to provide a load-bearing rail for the cargo space of a motor vehicle, which may assume additional functions in order to both keep the weight low and to reduce the number of parts, thus lowering the cost of production and assembly.

The present invention achieves this by providing a load-bearing rail for the cargo space of a motor vehicle, which is used for accommodating a load-bearing eyelet that can be guided therein in a movable and lockable manner, wherein the load-bearing rail is provided with a bracket, which sticks out laterally and which serves as a support for a floor of the cargo space. The inventive load-bearing rail has the advantage that the load-bearing rail no longer represents an additional component, but rather is used simultaneously to support the floor of the cargo space. Therefore, the costs of production and assembly, as well as additional working operations, are lowered.

The features, disclosed and claimed herein, make possible the advantageous further developments of the inventive load-bearing rail.

According to one advantageous design, the bracket is set back from the top side of the load-bearing rail by an amount equivalent to the thickness of the floor of the cargo space, so that the floor of the cargo space and the top edge of the load-bearing rail are in one plane. This is especially advantageous while loading, because the cargo space does not exhibit any protruding edges and/or corners, but rather forms in essence a planar surface.

On the side opposite the bracket, the load-bearing rail is provided advantageously with a receptacle for a side panel or the like. The result is another simplification of the assembly process, because the load-bearing rail may accommodate not only the floor of the cargo space, but also the side panel or the like so as to securely fix their position.

Each of the load-bearing rails is weakened in a defined manner such that in the event of a rear-end collision the load-bearing rails buckle at least once and deform towards the top and/or to the side.

According to one advantageous embodiment of the invention, the load-bearing rail exhibits a channel, the cross section of which is C-shaped and into which may be inserted a steel insert, the cross section of which is also C-shaped and the edges of which are provided with locking teeth for fixing the load-bearing eyelet in position. This offers the possibility of punching the locking teeth for the load-bearing eyelet directly into the inside profile. Furthermore, the external profile brings about the advantageous effect that the side panel can be fastened by way of the external profile; and the floor of the cargo space may be accommodated therein. Consequently, the result is a simplification of the attachment of the side panel and the cargo space floor in the cargo space of a vehicle, as well as an enhanced visual appearance.

For reasons relating to weight reduction, the load-bearing rail may be made advantageously of aluminum or the like.

Other advantages and features of the present invention are evident from the following detailed description of one embodiment of an inventive load-bearing rail in conjunction with the enclosed drawings.

BRIEF DESCRIPTION OF THE DRAWINGS

FIG. 1 is an exploded perspective view of a load-bearing rail according to the invention;

FIG. 2 is a perspective view of a load-bearing eyelet used in connection with the load-bearing rail according to the invention;

DETAILED DESCRIPTION OF THE DRAWINGS

Figure 3:
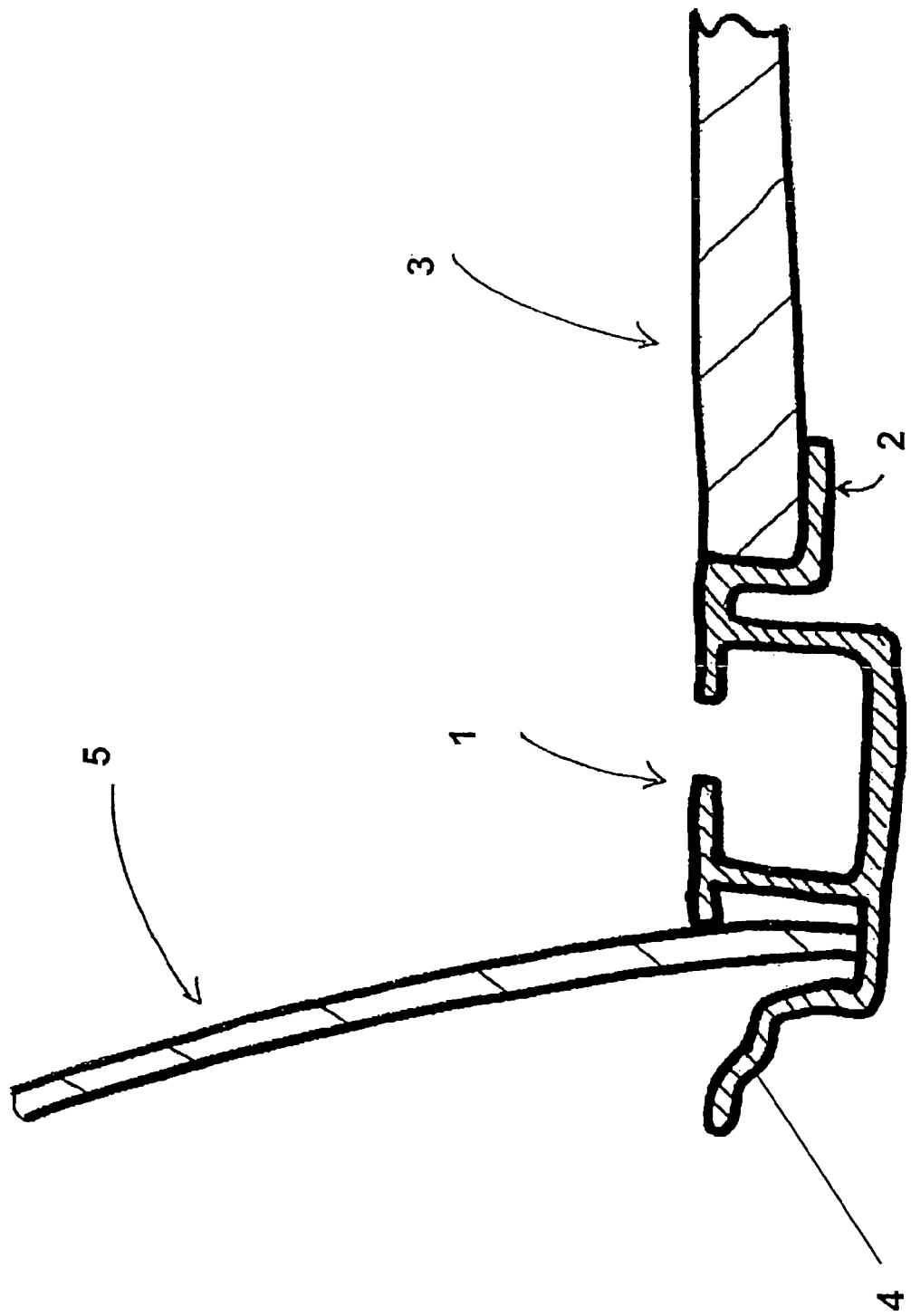
FIG. 3 is a cross sectional view of the load-bearing rail according to the invention.

FIGS. 1 and 3 depict the inventive load-bearing rail 1 in an exploded perspective view (FIG. 1) and a sectional view (FIG. 3), respectively. The load-bearing rail 1 includes a channel, the cross section of which is C-shaped. One side of the load-bearing rail (on the right in FIGS. 1 and/or 3) exhibits a bracket 2, which descends outwardly and which is set back from the top edge of the load-bearing rail 1. The bracket 2 protrudes laterally and forms a support for a floor 3 of the cargo space. The amount by which the bracket 2 is offset from the top edge of the load-bearing rail 1 is equivalent in essence to the thickness of the floor 3 of the cargo space, so that the result is a planar surface in the cargo space. The bracket 2 is formed substantially in the shape of a Z and passes with its top horizontal leg over into the top side of the load-bearing rail 1, whereas the bottom horizontal leg protrudes towards the outside and serves as a support for the floor of the cargo space.

The side of the load-bearing rail 1 opposite the bracket 2 exhibits a receptacle 4, which is open toward the top and is intended for the side panel 5 of the cargo space or the like. The receptacle 4 sticks out laterally from the bottom side of the load-bearing rail 1 and extends with one free leg diagonally outwardly at the top.

As shown in FIG. 1, a steel insert 6, the cross section of which is also C-shaped and the upwardly oriented open side of which is provided with locking teeth 7 for engaging with a load-bearing eyelet 8, is inserted into the load-bearing rail 1.

The load-bearing rail 1, which is made preferably of aluminum or the like, and, if desired, also the steel insert 6, exhibit defined weakenings (not illustrated) in order to be able to deform in the event of a rear-end collision.

FIG. 2 depicts the load-bearing eyelet 8, which interact with the load-bearing rail 1 of the invention. In this case, the load-bearing eyelet 8 encompasses a base body 9, to which is fastened a steel bow 10. A strap or a rope engages with the steel bow 10 for the purpose of securing objects in the cargo spaces of motor vehicles. The base body 9 exhibits an extension 11 and may be introduced with the same into the steel insert 6 and be locked with locking means (not illustrated) in the locking teeth 7 of the steel insert 6 at any random point.

Figure 4:
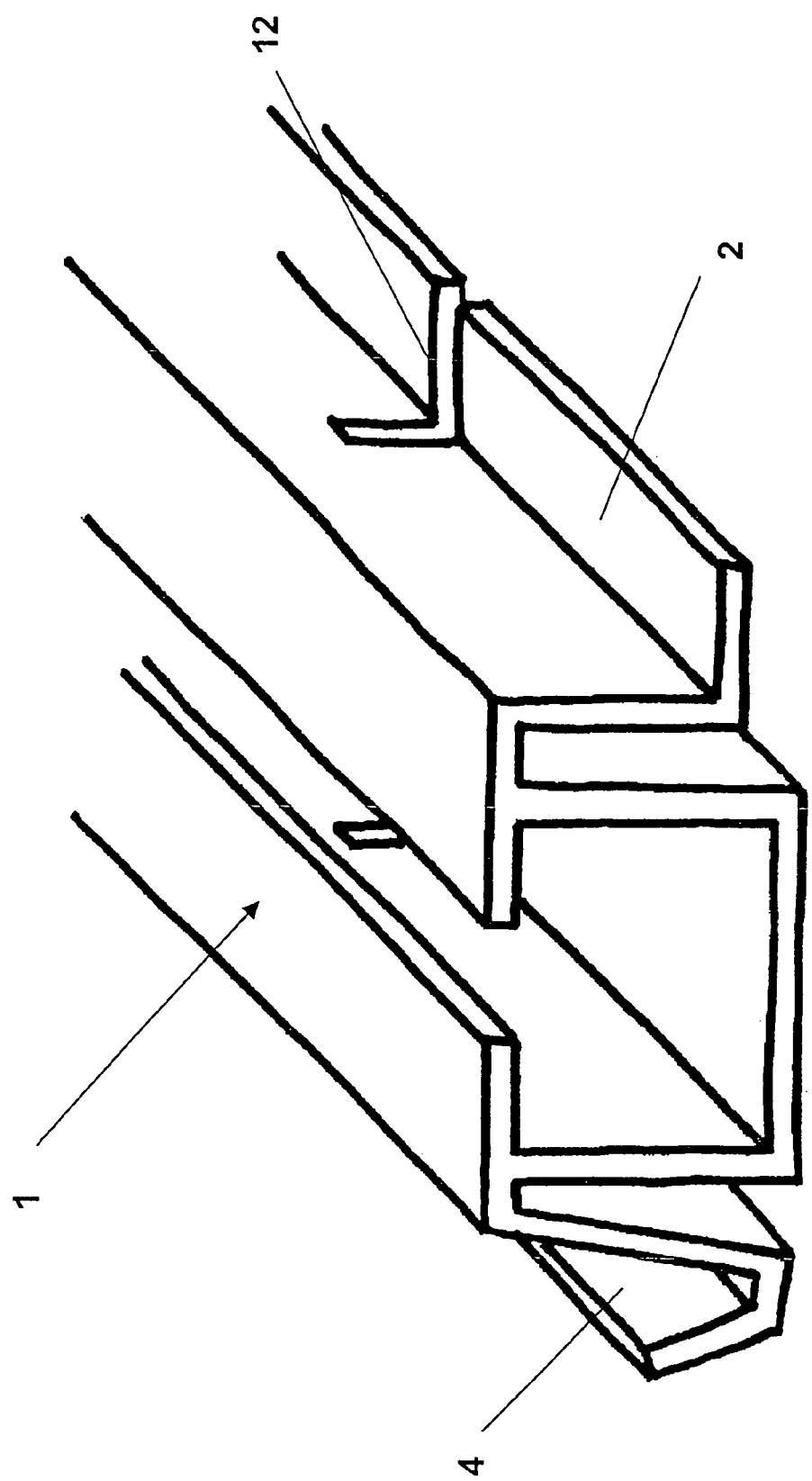
FIG. 4 is a cross sectional view of another embodiment of the load-bearing rail according to the invention.

FIG. 4 shows another embodiment of the load-bearing rail 1 of the invention. In this case, the receptacle 4, which is open towards the top and which is provided on the side of the load-bearing rail 1 opposite the bracket 2, and which is intended for the side panel 5 of the cargo space or the like, does not stick out laterally (as shown in FIG. 3) from the bottom side of the load-bearing rail 1, but rather it proceeds from the top side of the load-bearing rail 1 and extends diagonally toward the bottom with a substantially U-shaped mounting at the bottom end, which forms the receptacle 4 for the side panel 5 or the like. In addition, FIG. 4 shows the defined weakening 12 of the load-bearing rail 1, which consists of a notch starting from the bottom side of the load-bearing rail 1. This notch extends transversely across the longitudinal direction of the load-bearing rail 1 and reaches as far as about half way up the height of the load-bearing rail 1, so that the upper area of the latter is formed so as to be continuous.

Figure 5:
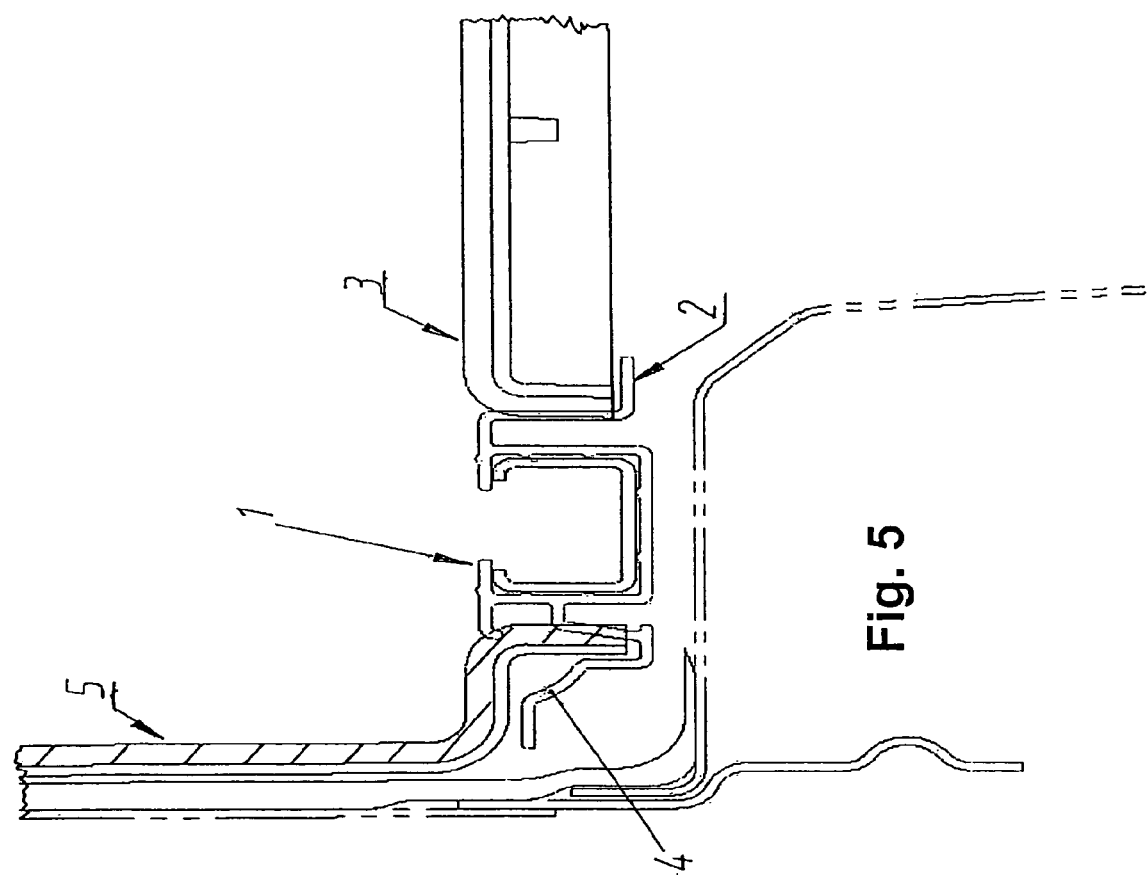
FIG. 5 is a cross sectional view of the inventive load-bearing rail with a mounted floor of the cargo space and inserted slide panel.
Figure 6:
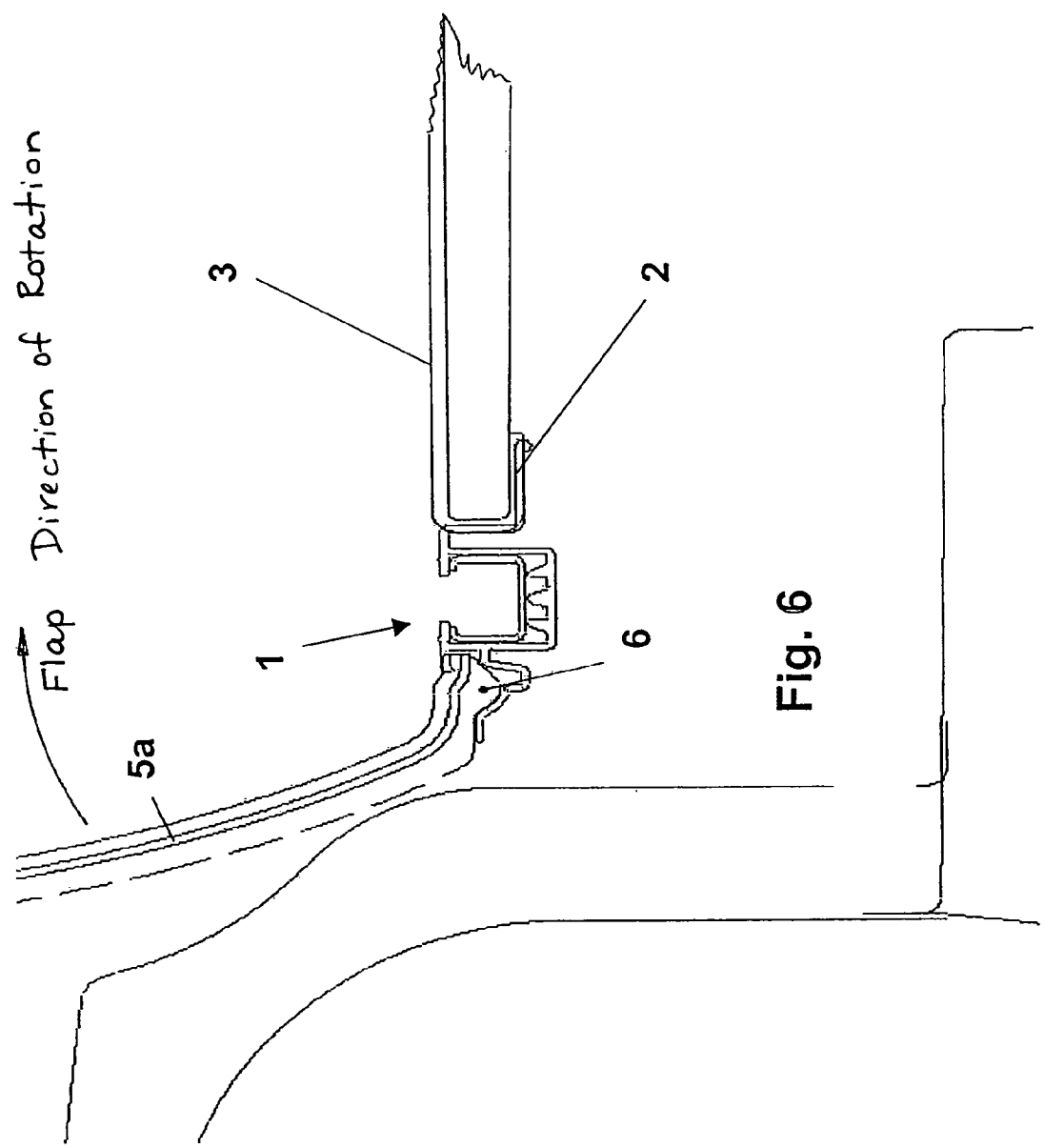
FIG. 6 is a cross sectional view of the inventive load-bearing rail with mounted cargo space floor, where the receptacle for the side panel is designed in such a manner that it serves simultaneously as a bearing for a flap provided in the side panel.

FIGS. 5 and 6 depict another alternative design of the inventive load-bearing rail 1. In both figures, a floor 3 of the cargo space is placed on the bracket 2 of the load-bearing rail 1. Furthermore, a side panel 5 is inserted into the receptacle 4. The receptacle 4, shown in FIGS. 5 and 6, is also provided with a bow-shaped segment, which forms a swivel bearing 6 for a flap 5a provided in the side panel 5. Thus, the flap 5a—as shown by the arrow in FIG. 6—and the swivel bearing 6 may be swung in the direction of the interior of the vehicle.

The above description of the exemplary embodiment, according to the present invention, serves only for illustrative purposes and not for the purpose of limiting the invention. Many variations and modifications are possible within the scope of the invention without departing from the scope of the invention or its equivalent.

What is claimed is:

1. A load-bearing rail assembly for a cargo space of a motor vehicle, comprising:
   a C-shaped rail channel;
   a bracket extending out laterally from one side of the rail channel and serving as a support for a floor of the cargo space;
   a receptacle located outwardly of another side of the rail channel that is opposite the one side so as to receive a side panel of the motor vehicle;
   a C-shaped insert selectively insertable into said rail channel and having locking teeth therealong; and
   a load-bearing eyelet member having a portion extending above the cargo space floor to allow stored items to be secured and configured to be guided movably along the rail channel, said eyelet member further having a portion configured to cooperate with the insert locking teeth for selectively locking the eyelet member at a desired point along the rail channel.

2. The load-bearing rail assembly according to claim 1, wherein the bracket is set back from a top side of the load-bearing rail by an amount equivalent to a thickness of the floor of the cargo space, so that the floor of the cargo space and the top side of the load-bearing rail are in one plane.

3. The load-bearing rail assembly according to claim 1, wherein the load-bearing rail is weakened in a defined manner.

4. The load-bearing rail assembly according to claim 3, wherein the weakening in a defined manner comprises a notch, which runs transversely across a longitudinal direction of the load-bearing rail assembly and which proceeds from a bottom side of the load-bearing rail assembly and extends only over a sub-area of an overall height of the load-bearing rail assembly.

5. The load-bearing rail assembly according to claim 1, wherein at least a portion of the load-bearing rail assembly is made of aluminum.

* * * * *